United States Patent [19]

Haskell et al.

[11] Patent Number: 4,620,223

[45] Date of Patent: Oct. 28, 1986

[54] INTERFEROMETRIC DEFORMATION ANALYSIS SYSTEM

[75] Inventors: Richard E. Haskell; Yau Y. Hung, both of Rochester, Mich.

[73] Assignee: Industrial Holographics, Inc., Auburn Heights, Mich.

[21] Appl. No.: 652,979

[22] Filed: Sep. 21, 1984

Related U.S. Application Data

[63] Continuation of Ser. No. 414,519, Sep. 3, 1982.

[51] Int. Cl.⁴ .............................................. H04N 7/18
[52] U.S. Cl. ...................................... 358/107; 73/573; 73/656; 356/348; 358/93; 358/217; 358/223
[58] Field of Search ................. 358/93, 106, 107, 217, 358/223, 2; 73/656, 573; 356/348

[56] References Cited

U.S. PATENT DOCUMENTS

| | | | |
|---|---|---|---|
| 3,545,259 | 12/1970 | Grant | 73/656 |
| 3,649,754 | 3/1972 | Macovski | 358/106 |
| 3,735,036 | 5/1973 | Macovski | 358/106 |
| 3,816,649 | 6/1974 | Butters | 356/357 |
| 3,943,278 | 3/1976 | Ramsey | 358/106 |
| 4,167,728 | 9/1979 | Sternberg | 382/49 |
| 4,392,745 | 7/1983 | Wright | 356/348 |

*Primary Examiner*—Howard W. Britton
*Attorney, Agent, or Firm*—Krass & Young

[57] ABSTRACT

Object deformations are analyzed by recording interferometric images using a television camera. The camera's photosensitive recording cathode is successively exposed to interferometric images of the object, respectively before and after a stress is applied to the object, while the camera's scanning beam is blanked out in order to record a composite image having fringe families arrayed as a function of the deformation of the object. Subsequent scanning of the cathode produces video signals representing variations of intensity in the superimposed illumination patterns of the composite image. The video signals may be digitized, analyzed and displayed on a cathode ray tube.

15 Claims, 4 Drawing Figures

INTERFEROMETRIC DEFORMATION ANALYSIS SYSTEM

DESCRIPTION

This application is a continuation of Ser. No. 414,519, filed 9-3-82.

TECHNICAL FIELD

The present invention generally relates to a system for mapping the deformation which occurs in an object which is subjected to stress, and deals more particularly with a system employing coherent optical phenomena.

BACKGROUND ART

Deformation mapping using interferometric techniques is finding increasing application in areas such as stress analysis, vibration studies, inspection of hidden flaws in structures, material property evaluation, thermal measurement and optical component testing. As used herein, the term "deformation" refers to the relative displacement of points on an object's surface relative to one another resulting from the imposed stress, as distinguished from overall, uniform displacements resulting from these stresses.

One deformation mapping technique for analyzing the overall deformation of an entire surface on an object (as opposed to relative displacement of various points on such surface) involves holographic interferometry as disclosed in U.S. Pat. No. 3,545,259 to GRANT. This technique merely measures the overall translation displacement due to deformation and rigid body motion, and provides little insight into deformations resulting from imperfections or nonuniformities in the object.

Another technique known as speckle interferometry involves reconstruction of fringe patterns wherein fringe lines represent loci of constant displacement. The so called speckle pattern is the result of the interference between light reflected from different points on the object which focus on the retina.

Still another technique sometimes referred to as shearography produces interference fringes which represent a displacement gradient, i.e., the relative displacement of two points on the surface of an object. If these two points on the object surface are moved in a uniform manner, no useful information is gained from the fringe patterns. The displacement gradient measured in shearography represents strain.

Each of the techniques described above involves a form of double exposure of a photographic plate or the like to the object before and after the latter has been stressed. However, the use of a photographic plate to record the interfering images is both time consuming and costly, particularly where the inspection process is carried out in a production environment.

As evidenced by U.S. Pat. No. 3,816,649 to BUTTERS, others have explored the possibility of using a television camera in lieu of a photographic plate to record the interfering images. The method disclosed in BUTTERS involves exposing the signal plate of the camera to an image of the object before the latter is stressed. The signal plate is then scanned by an electron beam in the conventional raster manner and the resulting video signals are digitized and stored for later use in constructing the first image. The object is then stressed and the signal plate is exposed to a second image of the stressed object. The signal plate is scanned a second time by an electron beam. The first digitized image is recalled from memory and is delivered to a differentiation circuit which compares the first and second images and produces a composite image which is displayed on a conventional CRT (cathode ray tube). Although this system essentially operates on a real time basis, providing rapid display of the interfering images, the quality of the resultant image is rather poor. The primary reason for this poor image quality involves the fact that the electron beam used in conventional raster scanning of the camera's vidicon cathode is limited to approximately 1000 lines per inch of maximum resolution. Thus, because the two images are read out at separate times and then later superimposed, the resultant image is of much poorer resolution then if the images were first superimposed on the vidicon cathode and then read out by the scanning beam. The present invention is directed toward overcoming each of the difficiencies discussed above.

DISCLOSURE OF THE INVENTION

The present invention provides a method and apparatus for recording interferometric images using a television camera which significantly improves the resolution of the resultant composite image which is used for analyzing deformations in an object. According to one aspect of the present invention, images are superimposed on a vidicon cathode and simultaneously converted to video signals without the need for digitization and temporary storage of either image. The vidicon cathode is first exposed to an image of the object using the technique of shearography or speckle interferometry. During this first exposure and immediately thereafter, the vidicon's scanning electron beam is blanked, while the object is stressed and the cathode is exposed to a second image of the object. The vidicon cathode preferably consists of photoconductive material which possesses persistent characteristics so as to retain the first image until the second exposure can be effected. The electron beam is then allowed to scan the superimposed images on the vidicon cathode, thereby converting the composite image to video signals which are then processed in the normal manner and displayed on a CRT or the like. The first and second exposures may be conducted during vertical retrace of the scanning beam. The videcon effectively filters out the high frequency fringes that are inherent in the shearographic method of interferometry so that the videcon inherently performs the essential filtration function in the shearographic interferometry process. In accordance with another aspect of the invention, a novel optical element for use in practicing shearography is provided which consists of a pair of mirrorized surfaces having differing reflectivities and a refraction medium therebetween which shears reflected, coherent light from the surface of the object, so as to create two object beams which interfere with each other at a focal point on the vidicon cathode.

BRIEF DESCRIPTION OF THE DRAWINGS

In the drawings, which are to be read in conjunction with the specification and in which like reference numerals are employed to designate identical components in the various views.

BEST MODE FOR CARRYING OUT THE INVENTION

Figure 1:
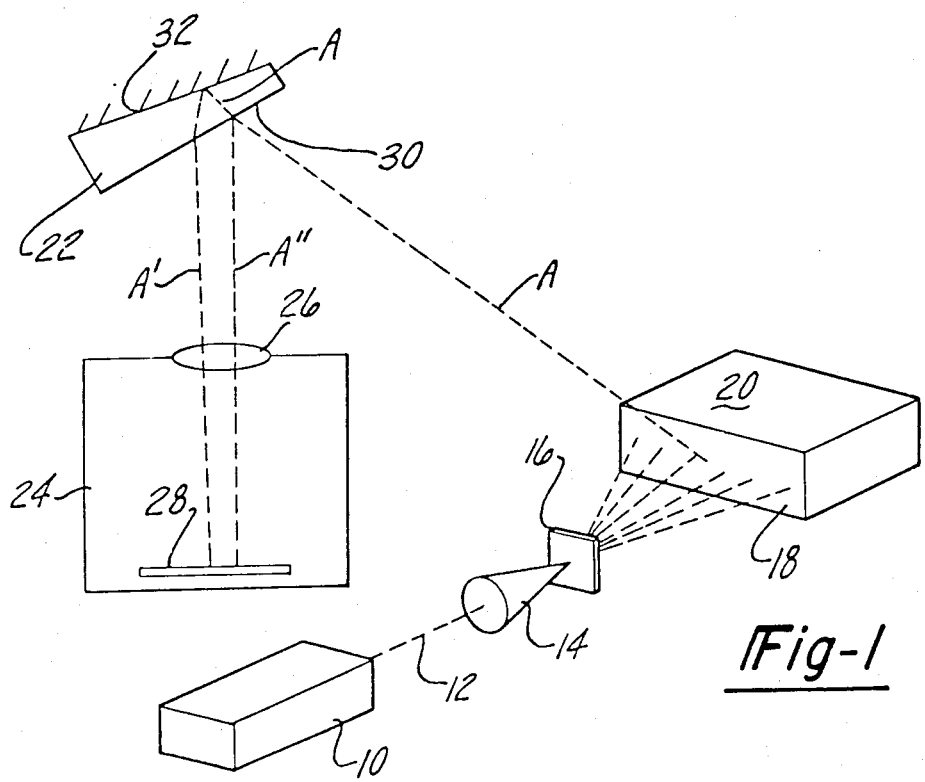
FIG. 1 is a combined diagrammatic and perspective view of an optical inspection system in accordance with the present invention.
Figure 2:
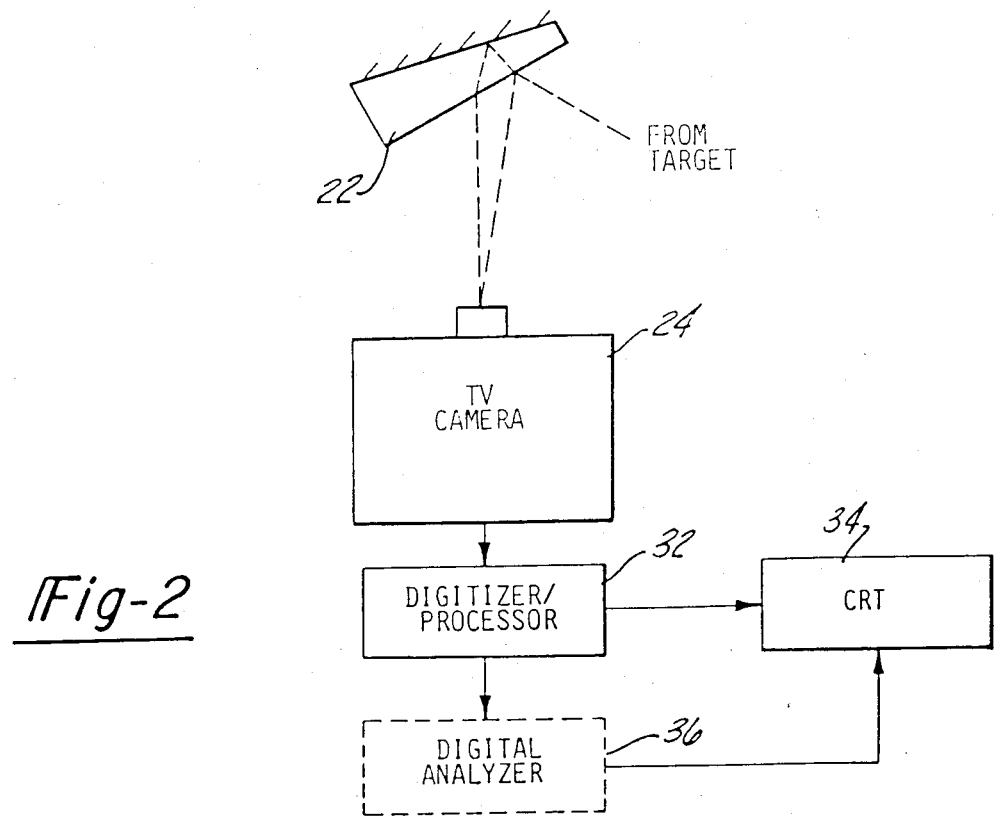
FIG. 2 is a combined diagrammatic and block diagram of a display and processing apparatus for use in connection with the system shown in FIG. 1.
Figure 3:
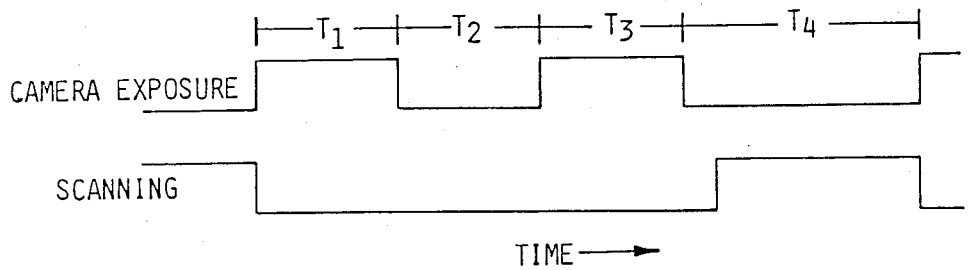
FIG. 3 is a diagrammatic view of an alternate arrangement for illuminating an object for use in the system shown in FIG. 1.

Referring first to FIGS. 1-3, the method and apparatus of the present invention are adapted to analyze the strain pattern occurring on the surface 18 of an object 20 under study as a result of a stress imposed on the object by any of several techniques such as altering the ambient pressure on the object, changing the object's temperature or changing mechanical loading on the object. As particularly shown herein, the object 20 is block shaped for illustrative purposes, but may, by way of example, consist of a rubber molding that is to be tested for inclusions adjacent to the surface 18. Surface 18 is illuminated with a coherent light derived from a laser 10. Laser 10 outputs a laser beam 12 which passes through a diverging lens 14 and pin hole filter 16 so as to expand the beam. Alternatively, the beam 12 could be expanded with a ground glass diffuser or the like.

Coherent light reflected from the surface 18, such as ray A is reflected through the lens 26 of a television camera 24 by way of an optical element 22. Optical element 22 may be wedge-shaped in cross section and includes outer and inner reflective surfaces 30 and 32 respectively. The outer reflective surface 30 is provided with a suitable reflective coating thereon which provides surface 30 with a reflectivity less than unity so as to allow passage therethrough of a portion of the light to surface 32 and reflect the remaining portion of the light through lens 26 of camera 24. The portions of light ray A which are reflected from surfaces 32 and 30 are respectively designated as A' and A".

Optical element 22 consists of an optical medium such as glass which refracts ray A' from surface 30 to surface 32. Surface 32 preferably has a reflectivity of unity, thus reflecting ray A' back through surface 30 and into the lens 26. It may thus be appreciated that the optical element 22 shears light ray A into a pair of rays A', A", which are delivered through lens 26. Surfaces 30 and 32 converge towards each other somewhat, thus causing rays A' and A" to converge toward each other after exiting from optical element 22. Rays A', A" pass through lens 26 and converge to interfere with each other on the surface of the signal plate 28 of the camera 24. Rays A', A" thus form an interfering image corresponding to various points on the surface 18 of target 20.

Signal plate 28 includes a composite layer of photoconductive material which preferably has a low dark current so as to retain an image thereon for a time period sufficient to allow stress to be imposed on the object 20 and a double exposure to be formed on the plate 28. The interfering image formed by rays A', A" focused onto the signal plate 28 produces a charge pattern which is raster scanned by an electron gun (not shown) which forms a conventional part of the camera 24. Raster scanning of the signal plate 28 produces video signals which may then be processed as will be discussed more fully hereinafter.

In accordance with the method of the present invention, the signal plate 28 is exposed to a first image of the surface 18 before the object 20 is stressed, and while the scanning beam is "blanked" (i.e., prevented from scanning the signal plate 28) thereby producing a first interferogram on signal plate 28. While the scanning beam is blanked, a stress is applied to the object 20 and the signal plate 28 is exposed a second time to an image of the surface 18, thereby creating a second interferogram which is superimposed on the first interferogram present on signal plate 28. After the second exposure has been completed, scanning of the composite image on signal plate 28 is commenced, thereby producing video signals corresponding to one frame of the television image; these video signals are then digitized and enhanced using conventional image processing techniques by a conventional digitize/processor 32, and the resultant signals are displayed as a final composite image on a CRT 34. If desired, the digitized image may be analyzed by a digital analyzer 36 prior to display on CRT 34. Digital analyzer 36 may comprise any of various apparatus for analyzing and operating on digitized image data such as the apparatus disclosed in U.S. Pat. No. 4,167,728 to STERNBURG which consists of a chain of substantially identical serial neighborhood transformation modules which are utilized to analyze patterns represented by a serial stream of digitized electrical signals representing a matrix of points corresponding to the image.

The relationship between the scanning of signal plate 28 and the double image exposures may best be understood by referring to FIG. 3. During time period $T_1$ the first exposure is made following which the object 20 is stressed during $T_2$. Then, a second exposure is made during $T_3$. During the time period $T_1+T_2+T_3$, the scanning beam is held low, i.e. "blanked". Subsequently, during period $T_4$, plate 28 is scanned by the beam.

Figure 4:
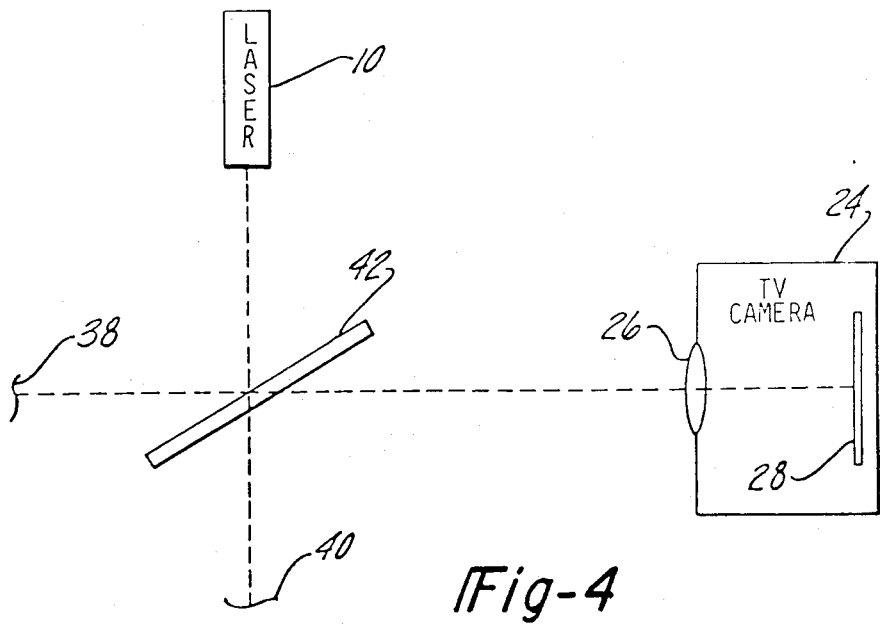
FIG. 4 is a diagrammatic view of an alternate arrangement for producing composite interfering images in connection with the system shown in FIG. 1.

Various arrangements may be devised to produce composite interfering images on the signal plate 28 of camera 24. For example, another suitable arrangement is depicted in FIG. 4, which includes a laser 10 which directs a beam of coherent light onto a semi-reflecting mirror 42. The light reflected by mirror 42 illuminates a surface 38 to be investigated, while the light transmitted by the mirror 42 illuminates a reference surface 40 of the same general form as surface 38. Surfaces 38 and 40 are disposed symmetrically with respect to mirror 42. Surfaces 38 and 40 are arranged to be viewed simultaneously by the television camera 24, which is focused such that light scattered from the surfaces 38 and 40 and respectively transmitted and reflected by mirror 42 is imaged by means of lens 26 onto the signal plate 28. It will be appreciated that this arrangement produces two independent speckle patterns respectively derived from the surfaces 38 and 40 which are collectively themselves a speckle pattern. The apparatus functions by comparing the resultant of the speckle patterns derived from the surfaces 38 and 40, both before and after surface 38 is stressed. In other words, a first interferogram is recorded on signal plate 28 before surface 38 is stressed, following which surface 38 is stressed and a second interferogram is recorded before signal plate 28 is scanned. The fringe lines of the speckle pattern appearing on a cathode ray tube using video signals produced in the arrangement shown in FIG. 4 are loci of constant displacement.

In view of the foregoing, it is apparent that the method and apparatus described above not only provide for the reliable accomplishment of the invention, but do so in a particularly effective and economical manner. It is recognized, of course, that those skilled in the art may make various modifications or additions to the preferred embodiment chosen to illustrate the invention without departing from the spirit and scope of the present contributions to the art. Accordingly, it is to be understood that the protection sought and to be afforded hereby should be deemed to extend to the subject matter claimed and all equivalents thereof fairly within the scope of the invention.

We claim:

1. A method of analyzing the deformation of an object resulting from the application of a stress thereon comprising the steps of:
    (a) illuminating the object with a source of coherent light;
    (b) receiving light reflected from said object and resolving said reflected light into first and second overlapping images of said object;
    (c) converging said first and second overlapping images into interfering relationship with each other to produce a first interferogram;
    (d) exposing the signal plate of a television camera to said first interferogram;
    (e) stressing said object;
    (f) producing a second interferogram using light reflected from the object when the latter is stressed;
    (g) exposing the signal plate of the camera to said second interferogram; and
    (h) scanning said signal plate after steps (a) through (g) are performed to produce video signals corresponding to a superimposed, composite image of the object having fringe families arrayed as a function of the deformation of the object produced by said stressing.

2. The method of claim 1, wherein step (b) is performed by:
    directing said reflected light onto a reflective optical element,
    reflecting a first portion of said light from a first reflective surface of said optical element to form said first image of said object, and
    reflecting a second portion of said light from a second reflective surface of said optical element to form said second image of said object.

3. The method of claim 1, wherein said source of coherent light is a laser.

4. The method of claim 1, including the steps of:
    digitizing said composite image,
    storing the digitized composite image, and
    displaying the digitized composite image.

5. The method of claim 1, wherein step (h) is performed by raster scanning said signal plate with a read-out beam.

6. The method of claim 5, including the step of blanking said beam while steps (d) and (c) are performed.

7. The method of claim 5, wherein steps (A), (B) and (f) are performed during the vertical retrace of said beam.

8. A method of optically inspecting an object comprising the steps of:
    (a) illuminating the object using a source of coherent light;
    (b) directing light reflected from said object onto a first partially reflective surface;
    (c) reflecting a first portion of the light directed onto said first partially reflective surface to reflect a first plurality of image rays;
    (d) passing a second portion of directed light through said first paritally reflective surface onto a second reflective surface;
    (e) reflecting said second portion of said directed light from said second reflective surface to produce a second plurality of image rays;
    (f) converging said first and second plurality of image rays to form a first pair of interfering images;
    (g) exposing a photoconductive surface to said first pair of interfering images to store a first, latent illumination pattern on said surface;
    (h) applying stress to the object;
    (i) exposing said photoconductive surface to a second pair of interfering images derived from light reflected from the object and thence from said first and second reflective surfaces when the object is under said stress thereby to store a second illumination pattern on said surface superimposed on said first, latent illumination pattern;
    (j) raster scanning said surface with a read out beam to produce video signals representing the variations of intensity in the superimposed illumination patterns, said variations of intensity being a function of the deformation of the object produced by said stress; and
    (k) blanking said beam to inhibit scanning of said surface until both steps (g) and (i) are completed.

9. The method of claim 8, including the steps of:
    digitizing the superimposed illumination pattern,
    storing the digitized pattern in a memory,
    recalling the digitized pattern from said memory, and
    displaying the superimposed illumination pattern on a cathode ray tube.

10. Apparatus for use in generating an image of an object containing interference fringes, comprising:
    means for producing a beam of coherent light;
    means for directing said beam onto said object;
    means for receiving light reflected from said object and operative to produce first and second interfering images of said object from said reflected light; and
    means for recording said first and second interfering images.

11. The apparatus of claim 10, wherein said recording means includes:
    a layer of photoconductive material upon which said first and second interfering images may be recorded as data,
    means for scanning said layer to read out the data recording on said layer, and
    means for converting the data read out by said scanning means to video signals.

12. The apparatus of claim 10 wherein said receiving means includes an optical element including a first reflective surface having a reflectivity less than unity for reflecting a first portion of said reflected light to form a first reflected image of said object and a second reflective surface spaced from said first reflective surface for reflecting a second portion of said reflected light transmitted through said first reflected surface, said second portion reflected from said second reflective surface forming a second reflective image of said object, said optical element further including an optical medium for refracting said second portion of said reflected light.

13. The apparatus of claim 12, wherein said first and second reflective surfaces converge toward each other.

14. The apparatus of claim 12, wherein said optical element is generally wedge shaped in cross section.

15. A method of analyzing the deformation of an object resulting from the application of a stress thereon, comprising the steps of:
 (a) illuminating the object with a source of coherent light;
 (b) producing a first interferogram utilizing the light reflected from the object;
 (c) exposing the signal plate of a television camera to said first interferogram;
 (d) stressing said object;
 (e) producing a second interferogram using light reflected from the object when the latter is stressed;
 (f) exposing the signal plate of the camera to said second interferogram; and
 (g) scanning said signal plate after steps (a) through (f) are performed to produce video signals corresponding to a superimposed, composite image of the object having fringe families arrayed as a function of the deformation of the object produced by said stressing;
 (h) said producing steps comprising producing an object light beam corresponding to an image of said object using light reflected from said object, illuminating a reference surface with a source of coherent light, producing a reference light beam corresponding to an image of said reference surface using light reflected by said reference surface, and directing said object beam and said reference beam into optically interfering relationship to each other.

* * * * *

UNITED STATES PATENT AND TRADEMARK OFFICE
CERTIFICATE OF CORRECTION

PATENT NO. : 4,620,223

DATED : October 28, 1986

INVENTOR(S) : Richard E. Haskell et al.

It is certified that error appears in the above-identified patent and that said Letters Patent is hereby corrected as shown below:

Column 2, line 47, "videcon" should be --vidicon--.

Column 4, line 24, "STERNBURG" should read -- STERNBERG--.

Column 5, line 59, "C" should be --G--.

Column 6, line 5, "paritally" should be --partially--.

Signed and Sealed this

Seventeenth Day of February, 1987

Attest:

DONALD J. QUIGG

Attesting Officer

Commissioner of Patents and Trademarks